(12) United States Patent
Fremerey et al.

(10) Patent No.: US 7,307,365 B2
(45) Date of Patent: Dec. 11, 2007

(54) MAGNETIC GUIDING DEVICE

(75) Inventors: Johan K. Fremerey, Bonn (DE); Matthias Lang, Zittau (DE)

(73) Assignee: Forschungszentrum Julich GmbH, Julich (DE)

( * ) Notice: Subject to any disclaimer, the term of this patent is extended or adjusted under 35 U.S.C. 154(b) by 252 days.

(21) Appl. No.: 10/510,737

(22) PCT Filed: Mar. 28, 2003

(86) PCT No.: PCT/EP03/03237
§ 371 (c)(1),
(2), (4) Date: May 27, 2005

(87) PCT Pub. No.: WO03/087602

PCT Pub. Date: Oct. 23, 2003

(65) Prior Publication Data
US 2005/0200218 A1     Sep. 15, 2005

(30) Foreign Application Priority Data
Apr. 12, 2002   (DE) ................................ 102 16 421

(51) Int. Cl.
*H02K 7/09* (2006.01)
*H02K 39/06* (2006.01)
(52) U.S. Cl. ...................................... 310/90.5; 310/90
(58) Field of Classification Search ................. 310/90, 310/90.5; 417/407
See application file for complete search history.

(56) References Cited
U.S. PATENT DOCUMENTS
3,976,339 A   8/1976   Sabnis 4,340,233 A  *  7/1982   Yamamura et al. .......... 277/302
4,620,752 A    11/1986   Fremerey et al.

(Continued)

FOREIGN PATENT DOCUMENTS
DE      195 43 745          5/1997

(Continued)

OTHER PUBLICATIONS
Patent Abstracts of Japan, Publication No. 06033941, Feb. 8, 1994.

*Primary Examiner*—Karl Tamai
*Assistant Examiner*—David W. Scheuermann
(74) *Attorney, Agent, or Firm*—Berenato, White & Stavish, LLC

(57) ABSTRACT

The invention concerns a magnetic guiding device (1) having at least one element (2) to be guided magnetically in the axial direction, e.g. a shaft or an actuation member that is movable in the axial direction, the element (2) having a radial flange (14) made of magnetizable material that is enclosed by an axial yoke (47) made of ferromagnetic material and constituting a stator, forming magnet gaps (51, 52) in which is producible, by means of a combination of permanent magnets and electromagnets (53, 54, 55), an axial magnetic flux with which the axial position of the element (2) can be influenced, which is characterized in that in the axial yoke (47), at least one pair of axially oppositely polarized permanent magnets (53, 54) are arranged axially next to one another, and an electromagnetic coil (55) is moreover arranged radially adjacently as an electromagnet, the magnetic flux in the coil (55) being controllable in such a way that an asymmetrical magnetic flux having an axial resultant force is producible in the magnet gaps (51, 52).

31 Claims, 3 Drawing Sheets

U.S. PATENT DOCUMENTS

| | | | |
|---|---|---|---|
| 5,250,865 A | 10/1993 | Meeks | |
| 5,310,311 A * | 5/1994 | Andres et al. | 415/229 |
| 5,315,197 A | 5/1994 | Meeks et al. | |
| 5,514,924 A | 5/1996 | McMullen et al. | |
| 5,729,065 A | 3/1998 | Fremery et al. | |
| 6,700,258 B2 * | 3/2004 | McMullen et al. | 310/90.5 |
| 6,846,167 B2 * | 1/2005 | Jaisle | 417/407 |
| 7,082,763 B2 * | 8/2006 | Fremerey et al. | 60/598 |
| 7,140,848 B2 * | 11/2006 | Jaisle | 417/407 |
| 2005/0198956 A1 * | 9/2005 | Fremerey et al. | 60/605.3 |

FOREIGN PATENT DOCUMENTS

| | | |
|---|---|---|
| DE | 102 16 421.5-51 | 4/2002 |
| EP | 0 580 117 | 1/1994 |
| EP | 844410 A1 * | 5/1998 |
| WO | WO 92/15795 | 2/1992 |
| WO | WO 98/35167 | 2/1998 |
| WO | WO 00/64030 | 4/2000 |
| WO | WO 00/64031 | 4/2000 |

* cited by examiner

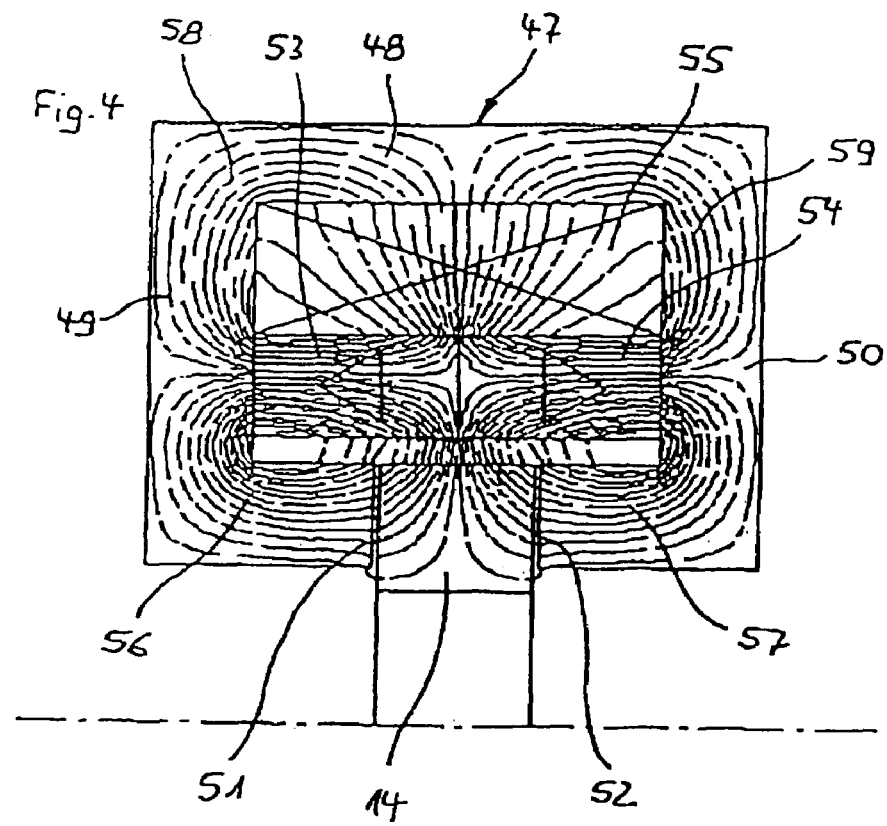
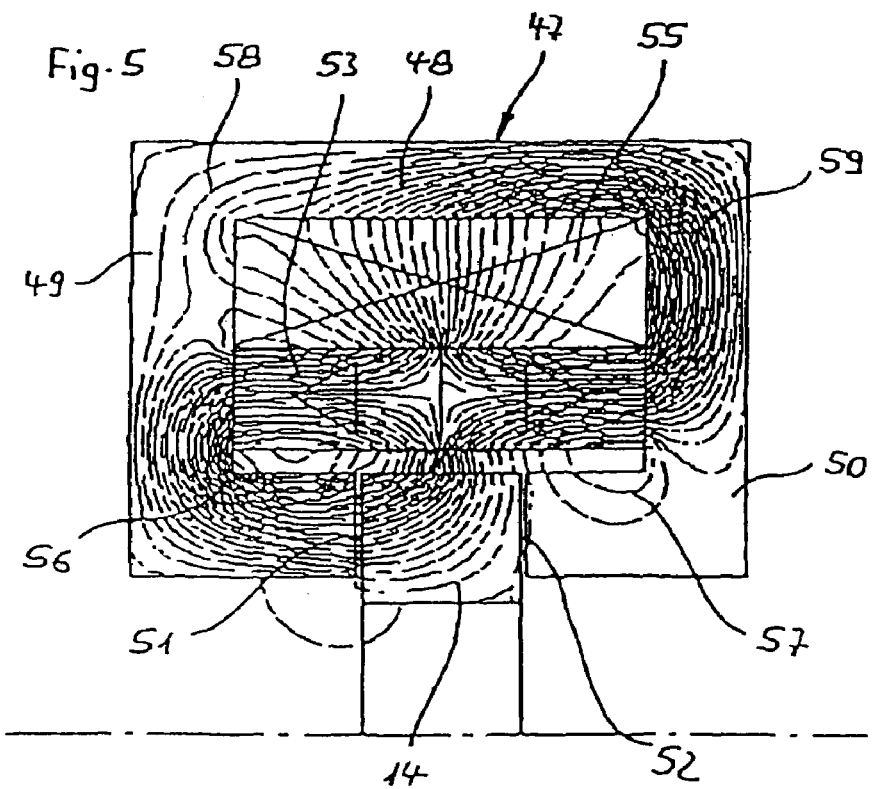

MAGNETIC GUIDING DEVICE

The invention concerns a magnetic guiding device having at least one element to be guided magnetically in the axial direction, e.g. a shaft or an actuation member that is movable in the axial direction, the element having a radial flange made of magnetizable material that is enclosed by an axial yoke made of ferromagnetic material and constituting a stator, forming magnetic gaps in which is producible, by means of a combination of permanent magnets and electromagnets, an axial magnetic flux with which the axial position of the element can be influenced.

Magnetic guiding devices are known in many embodiments, and can be used for a variety of purposes. One area of application encompasses the support of rotating shafts, for example in vacuum pumps, fluid measurement devices, blood pumps, gyroscopic devices, or spin rotors. A further area of application involves actuators in which a movable actuation member can be moved back and forth in the axial direction by means of magnetic force, for example as a pressure plunger, drive element for small distances, switch, valve actuator, etc. Merely by way of example, the reader is referred to the following documents from the plurality of publications disclosed for this purpose: U.S. Pat. No. 3,976,339; U.S. Pat. No. 5,315,197; U.S. Pat. No. 5,514,924; U.S. Pat. No. 4,620,752; WO 92/15795; U.S. Pat. No. 5,729,065; WO 00/64030; WO 00/64031.

FIGS. 3 and 4 of U.S. Pat. No. 5,315,197 and FIGS. 4 and 5 of U.S. Pat. No. 5,514,924 disclose magnetic guiding devices that comprise, as the element to be guided, a shaft that is magnetically guided in the axial direction. The shafts have for that purpose a radially projecting annular flange made of magnetizable material that is enclosed on both sides by an axial yoke made of ferromagnetic material and constituting a stator, forming magnet gaps. A radially polarized, permanently magnetized annular magnet, which is flanked on each side by a respective annular coil of an electromagnet, sits centeredly in the axial yoke. The result is to create two magnetic sub-fluxes, located next to one another in the axial direction, that combine in the region of the annular magnet. An axial magnetic flux is generated in the magnet gaps between the annular flange and the axial yoke. By controlling the current in the annular coils, the magnetic flux in the magnet gaps is adjusted in such a way that the shaft is centered axially in the axial yoke. Deviations from the target position are sensed by a magnetic field sensor that is part of a controller which controls the current in the annular coils in the manner described above.

A disadvantage of these known magnetic guiding devices is that as a result of the radial polarization of the permanent magnet, considerable radial forces are exerted on the shaft and can destabilize the shaft in the radial direction. The design complexity is moreover considerable, because of the provision of two physically separate electrical coils.

It is the object of the invention to embody a magnetic guiding device of the kind cited initially in such a way that instabilities in the radial direction are avoided as much as possible, and so that the magnetic guiding device can be configured substantially more simply in terms of design, and thus more economically.

This object is achieved, according to the present invention, in that in the axial yoke, at least one pair of axially oppositely polarized permanent magnets are arranged axially next to one another, and an electromagnetic coil is moreover arranged radially adjacently as an electromagnet, the magnetic flux in the coil being controllable in such a way that an asymmetrical magnetic flux having an axial resultant force is producible in the magnet gaps. With the combination of a pair of axially oppositely polarized permanent magnets and a radially adjacently arranged coil, the provision of two coils can be dispensed with. The one coil is sufficient to influence the axial magnetic flux in the magnet gaps in the desired manner by appropriate control of the direction and strength of the current, by the fact that the magnetic field is strengthened in the one magnet gap and weakened in the other magnet gap as necessary. An axial force can thereby be exerted on the radial flange.

As a result of the particular arrangement of the coil and permanent magnets, four magnetic sub-fluxes are created in the axial yoke, of which two in each case lie axially, and two radially, next to one another. Two of the magnetic sub-fluxes pass through the radial flange and generate axially and oppositely directed magnetic fields in the magnet gaps. The other two magnetic sub-fluxes pass outward through the axial yoke. It is understood that multiple permanent magnets and/or coils can also be provided radially next to one another.

The magnetic guiding device according to the present invention is characterized by low instability in the radial direction as well as less design complexity, since only one electrical coil is necessary. In addition, the force/current characteristic of the coil is not impaired by the permanent magnet.

If the magnetic guiding device is equipped with a controller, as is evident from the aforementioned documents, the magnetic guiding device according to the present invention can be used as a magnetic axial bearing for shafts, in which bearing the radial flange is permanently axially centered in a single defined position. The controller then comprises a magnetic flux sensor that senses axial motions of the element to be guided (i.e. the shaft) and controls current delivery to the coil in such a way that the radial flange, and thus the shaft, is held in substantially stationary fashion in the axial yoke. Additional radial bearings of mechanical or magnetic type can then ensure radial stabilization.

As already mentioned above, however, such magnetic guiding devices are also suitable for performing actuations by displacement of the element to be guided, i.e. for taking on the classic function of an actuator. A control device with which the element to be guided is movable axially back and forth out of a defined position is usefully provided for this purpose. The control device can also be combined with the above-described control device in such a way that the element is held in floating fashion in the defined position and also during the entire stroke, i.e. the stroke is not limited by stops.

In a further embodiment of the invention, provision is made for the radial flange to be embodied as an annular flange. This embodiment is useful in particular when the magnetic guiding device serves as an axial bearing for a shaft. The embodiment as an annular flange creates the possibility of arranging several axial yokes, of the kind described above, distributed around the circumference of the annular flange. It is simpler in terms of design, however, to embody the axial yoke as an annular yoke that surrounds the annular flange. The permanent magnets are usefully embodied in this context as axially magnetized annular magnets, and the coil as an annular coil.

In order to generate a magnetic field that is as loss-free as possible, the permanent magnets should be in contact in gapless fashion against the axial yoke and against one another. For the same reason, the coil should be in contact in gapless fashion against the axial yoke and against the permanent magnets. The only remaining magnet gaps are thus between the radial flange and axial yoke.

According to a further feature of the invention, provision is made for the permanent magnets to be radially adjacent to the circumferential side of the radial flange, and for the coil to sit radially externally therefrom. This results in a particularly favorable magnetic flux.

It is understood that the element can comprise several radial flanges one behind another in the axial direction, and each radial flange can be enclosed by an axial yoke having the arrangement according to the present invention of permanent magnets and coil.

Provision is further made according to the invention for at least one preferably magnetic radial bearing additionally to be present for the element. A radial bearing of this kind (or even several of them) is advisable particularly when a shaft is to be held in radially centered fashion, and tilting stresses on that shaft are to be compensated for. A radial bearing of this kind can also, however, be provided in order to improve the guidance of an actuation element (actuator).

The magnetic radial bearing should respectively comprise a bearing ring sitting on the shaft and a radial bearing stator axially opposite that ring on at least one side, permanent magnets being provided both in the bearing ring and in the radial bearing stator. Several permanent magnets should be arranged next to one another in the radial direction, advantageously being in contact against one another and being polarized in alternately opposite fashion, i.e. each two adjacent permanent magnets on the radial bearing stator or on the bearing ring are oppositely polarized. Particularly high magnetic forces are thereby generated.

It is possible in principle for the radial bearing stators to comprise several sub-stators distributed over the circumference and having permanent magnets. It is simpler in terms of design, however, to embody the radial bearing stator as an annular stator and the permanent magnets as annular magnets.

It is sufficient for each bearing ring to have a radial bearing stator associated with it only on one side. The radial bearing stator can be arranged and embodied in such a way that an axial force is permanently generated in one direction. This can also occur with an embodiment in which the bearing ring is enclosed on both sides by radial bearing stators having permanent magnets. In this way it is possible to achieve a particularly powerful magnetic flux that counteracts any radial deflection of the shaft. It is understood that several radial bearings can be provided which, in that context, are also differently configured, i.e. the bearing ring of the one radial bearing comprises a radial bearing stator only on one side, whereas the bearing ring of the other radial bearing has radial bearing stators on both sides. It is also understood that within a radial bearing, several bearing rings having a corresponding number of radial bearing stators can also be provided. This case involves simply a serial arrangement of several radial bearings.

If two radial bearing stators are provided in one radial bearing, they should advantageously be combined into one yoke that is U-shaped in cross section.

Magnetic bearings have the property that they produce almost no damping. Provision is therefore made according to the invention for at least one radial bearing stator, preferably all the radial bearing stators, to be supported in radially movable fashion, via spring and damper elements, on a housing-mounted part of the magnetic guiding device. This can occur, for example, by means of axially extending flexural springs, in which context the radial bearing stator can be connected to the housing-mounted part via several flexural springs distributed over the circumference. The flexural springs can each be part of a cage that connects the ends of the flexural springs via cage rings, and is coupled at one end to the radial bearing stator and at the other end to the housing-mounted part. To yield a space-saving configuration, the cage should surround the respectively associated radial bearing stator.

It is additionally useful that the radial bearing stator, suspended on spring elements, is braced via at least one damping element against the housing-mounted part that damps the radial deflections of the spring elements. The damping element can be embodied in each case annularly and coaxially with respect to the shaft, and can be stressed either in compression or in shear. In a particular embodiment, the damping element is embodied as a liquid film preferably provided with magnetic or magnetizable particles, the liquid film being magnetically impinged upon at at least one point via a permanent magnet that can be part of the passive magnetic bearing. The liquid film is thereby magnetically trapped. The viscosity of the liquid film can be adapted to the particular damping requirements.

The invention is illustrated in more detail, with reference to an exemplary embodiment, in the drawings, in which:

FIG. 4 is an enlarged depiction of the axial bearing of the shaft bearing assembly according to FIG. 1; and FIG. 5 shows the axial bearing of FIG. 4 with active influencing of the magnetic flux.

Figure 1:
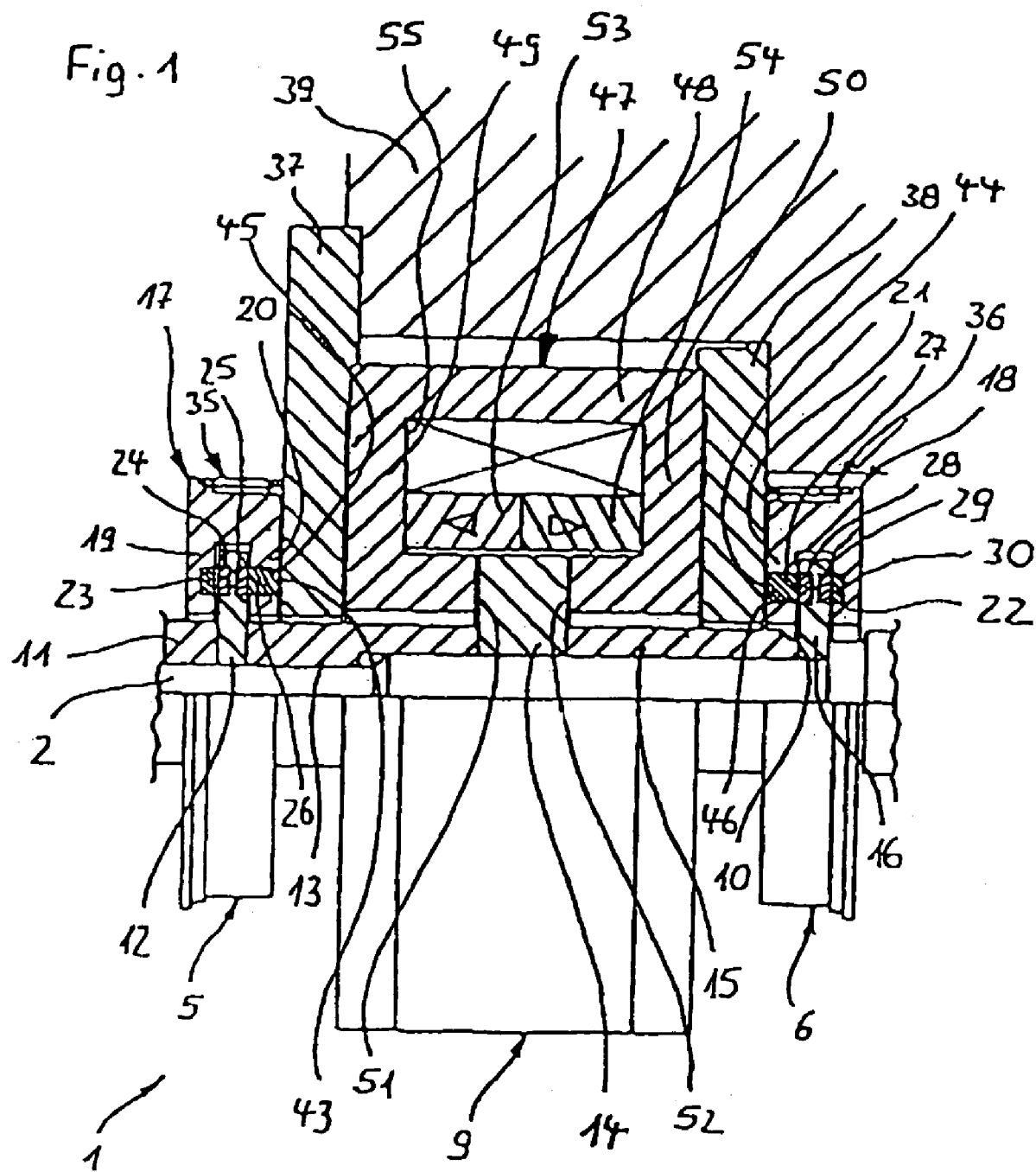
FIG. 1 is a side view of a completely magnetic shaft bearing assembly, with a partially sectioned depiction of the upper part.

Shaft bearing assembly 1 depicted in FIG. 1 comprises a shaft 2 that is supported in two radial bearings 5, 6 and an axial bearing 9 arranged therebetween.

As is evident from the upper part of FIG. 1, shaft 2 is surrounded by a total of six rings that are axially clamped against a shoulder 10 on shaft 2. A first shaft sleeve 11 having groove 7 is followed by a bearing washer 12, a second shaft sleeve 13, a bearing washer 14, a third shaft sleeve 15, and a further bearing washer 16.

Bearing washers 12, 16 belong to radial bearings 5, 6. They are respectively enclosed on either side by a radial yoke 17, 18 that is U-shaped in cross section and coaxially surrounds shaft 2, each radial yoke 17, 18 comprising a pair of radial bearing stators 19, 20 and 21, 22 that form the limbs of radial yokes 17, 18. Radial bearing stators 19, 20, 21, 22 and bearing washers 12, 16 comprise permanent magnets 23, 24, 25, 26 and 27, 28, 29, 20 that are located respectively opposite one another in the axial direction in the two radial bearings 5, 6. They are polarized in such a way that they attract one another, so that an axially directed and attractive magnetic force is created in the gaps between bearing washers 12, 16 and radial bearing stators 19, 20, 21, 22. The magnetic fields center shaft 2.

Figure 2:
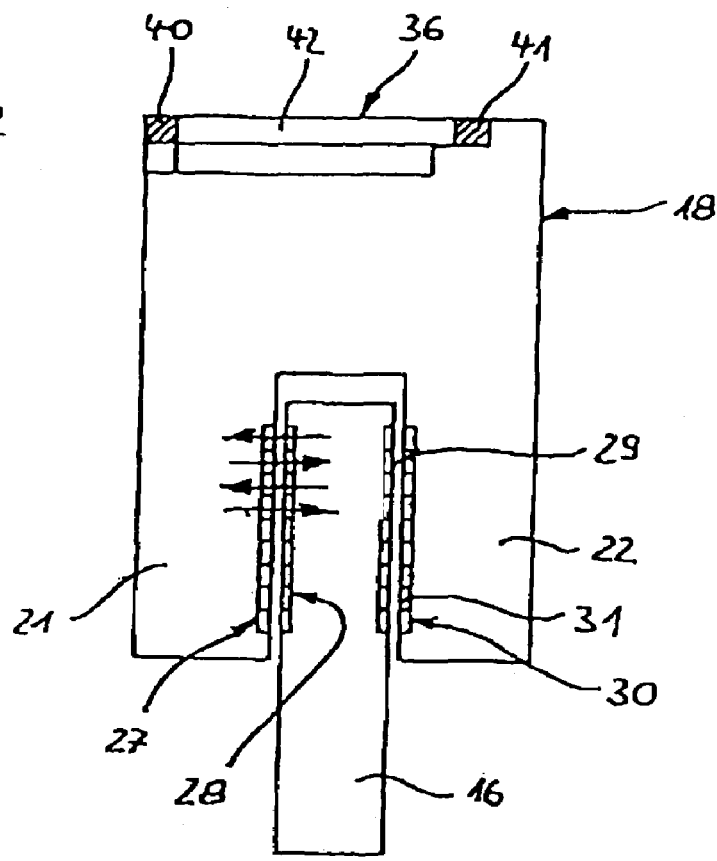
FIG. 2 is a cross section through a radial bearing of the shaft bearing assembly according to FIG. 1.

Permanent magnets 23 through 30 each comprise nine annular magnets (labeled 31 by way of example) set coaxially one inside another, as is evident from the enlarged depiction of radial bearing 6 in FIG. 2. The annular magnets 31 of a permanent magnet 23 through 30 are in contact against one another in the radial direction. Two ring magnets 31 adjacent in the radial direction are axially oppositely magnetized. The axially oppositely located annular magnets 31 of two adjacent permanent magnets 23 through 30 are polarized in mutually attractive fashion, so that an axial magnetic flux results.

Figure 3:
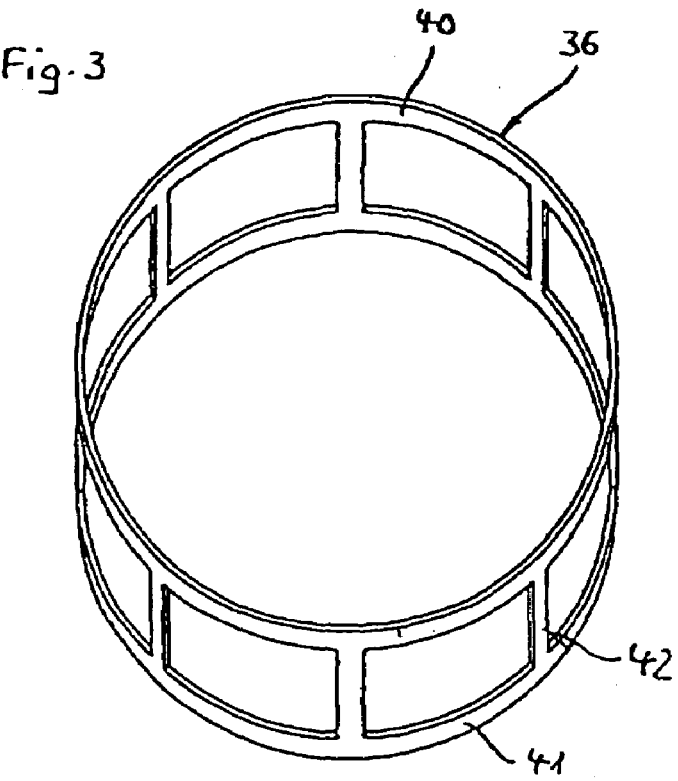
FIG. 3 is a perspective depiction of a spring cage for the radial bearing according to FIG. 2.

Radial yokes 17, 18 are surrounded externally by spring cages 35, 36 (omitted in the lower part of FIG. 1) that are connected at the outer edge to radial yokes 17, 18 and at the inner edge to housing washers 37, 38 (omitted in the lower part of FIG. 1) that in turn are secured to a housing 39. Spring cage 36 is depicted individually in FIG. 3. It has at the edges two cage rings 40, 41 that are connected via eight regularly distributed spring struts (labeled 42 by way of example) extending in the axial direction. Spring struts 42 permit a reciprocal parallel displacement of the two cage rings 40, 41, in which context spring struts 42 deflect radially. Radial yokes 17, 18 can thus be displaced radially.

Located between radial yokes 17, 18 and housing washers 37, 38 are narrow gaps in each of which a damping ring 43, 44 is provided (FIG. 1). Damping rings 43, 44 comprise a high-viscosity liquid film containing magnetic particles. In the context of a radial motion of radial yokes 17, 18, the liquid film is stressed in shear and thereby exerts a damping effect. It is trapped in radial yokes 17, 18 by annular magnets 45, 46.

Bearing washer 14 belongs to axial bearing 9. It is enclosed on either side by an annular yoke made of sheet Si iron. Annular yoke 47 is enclosed and immobilized between the two housing washers 37, 38. It has an outer yoke shell 48 from which proceed two inwardly directed yoke limbs 49, 50 that have an L-shaped cross section and enclose bearing washer 14 with limb segments directed toward one another, creating two magnet gaps 51, 52. Adjacent to the circumferential side of bearing washer 14 within annular yoke 47 are two permanent magnets 53, 54 located axially next to one another which, as symbolized by the triangles, are polarized axially oppositely. They are in contact against one another and against yoke limbs 49, 50. They are surrounded by an electromagnetic annular coil 55 that fills up the space between permanent magnets 53, 54, and between yoke shell 48 and yoke limbs 49, 50.

As is evident in particular from FIG. 4, a total of four magnetic sub-fluxes 56, 57, 58, 59 are generated by the two permanent magnets 53, 54, respectively adjacent magnetic sub-fluxes 56, 57, 58, 59 being oppositely directed. The inner magnetic sub-fluxes 56, 57 form axially directed magnetic fluxes in magnet gaps 51, 52, so that the surfaces located opposite one another in magnet gaps 51, 52 attract one another. The magnetic forces cancel one another out in the center position of bearing washer 14. The outer magnetic sub-fluxes 58, 59 proceed via yoke limbs 49, 50 into yoke shell 48, and from there via annular coil 55 back into annular magnets 45, 46.

Because of the magnetic instability of shaft 2 in the axial direction, an axial stabilization must be effected via axial bearing 9. This occurs, in the context of an axial deflection of bearing washer 14, by the fact that this deflection is sensed by a sensor (not depicted here in detail) that is known in the existing art, and as a result the controller (likewise not depicted) controls the current delivery to annular coil 55 in such a way that an additional magnetic flux is generated, resulting globally in an asymmetrical magnetic flux distribution within axial bearing 9. This is evident from FIG. 5. A minimal deflection of bearing washer 14 to the right exists in this case. Annular coil 55 is, as a result, impinged upon by an electric current whose direction is such that the diagonally opposite magnetic sub-fluxes 56, 59 are strengthened (symbolized by the more closely packed flux lines) and the other magnetic sub-fluxes 57, 58 are weakened. As a result, the attractive force in left-side magnet gap 51 increases, while the magnetic force in right-side magnet gap 52 weakens. The axial deflection of bearing washer 14 to the right is thus opposed by a magnetic attraction force in the axial direction, with the consequence that bearing washer 14 is once again centered with respect to annular yoke 47.

Axial bearing 47 depicted in FIGS. 4 and 5 can also be used separately from shaft bearing assembly 1, for example if shaft 2 is to be magnetically stabilized only in the axial direction and is supported in the radial direction by means of plain or rolling bearings. Axial bearing 47 can, furthermore, also be used as an actuator, for example if shaft 2 is embodied as a plunger. The plunger can, like shaft 2, be held in a floating position in shaft bearing assembly 1 in entirely magnetic fashion. The possibility also exists, however, of supporting the plunger in axially movable fashion by way of mechanical lateral bearing guides.

Within the width of magnet gaps 51, 52, bearing washer 14 (and therefore the plunger) can be axially displaced by the fact that coil 55 is impinged upon by a correspondingly directed electric current. The end faces of yoke limbs 49, 50 can serve as stops in this context. By corresponding control of the current acting on coil 55, bearing washer 14 can also be axially displaced between two magnetically defined positions, preventing it from coming to a stop against yoke limbs 49, 50. The plunger can be used, for example, to actuate electrical switches, as a pressure or stamping plunger, etc.

The invention claimed is:

1. A magnetic guiding device (1) having at least one element (2) comprising a shaft or an actuation member to be guided magnetically in the axial direction, the element (2) having a radial flange (14) made of magnetizable material that is enclosed by an axial yoke (47) made of ferromagnetic material and constituting a stator, forming magnet gaps (51, 52) in which is producible, by means of a combination of permanent magnets and electromagnets (53, 54, 55), an axial magnetic flux with which the axial position of the element (2) can be influenced, wherein in the axial yoke (47), at least one pair of axially oppositely polarized permanent magnets (53, 54) are arranged axially next to one another and in contact against one another, and an electromagnetic coil (55) is moreover arranged radially adjacently as an electromagnet, the magnetic flux in the coil (55) being controllable in such a way that an asymmetrical magnetic flux having an axial resultant force is producible in the magnet gaps (51, 52).

2. The magnetic guiding device as defined in claim 1, wherein a controller is present that is embodied such that the radial flange (14) is permanently axially centered in the axial yoke (47) in a single defined position.

3. The magnetic guiding device as defined in claim 1, wherein a control device is provided with which the element (2) is movable axially back and forth out of a defined position.

4. The magnetic guiding device as defined in claim 1, wherein the radial flange is embodied as an annular flange (14).

5. The magnetic guiding device as defined in claim 4, wherein several axial yokes (47), distributed around the circumference, are provided.

6. The magnetic guiding device as defined in claim 4, wherein the axial yoke is embodied as an annular yoke (47) that surrounds the annular flange.

7. The magnetic guiding device as defined in claim 6, wherein the permanent magnets (52, 54) are embodied as annular magnets, and the coil (55) as an annular coil.

8. The magnetic guiding device as defined in claim 1, wherein the permanent magnets (53, 54) are in contact against the axial yoke (47).

9. The magnetic guiding device as defined in claim 1, wherein the coil (35) is in contact against the axial yoke (47).

10. The magnetic guiding device as defined in claim 1, wherein the coil (55) is in contact against the permanent magnets (53, 54).

11. The magnetic guiding device as defined in claim 1, wherein the permanent magnets (53, 54) are radially adjacent to the circumferential side of the bearing ring (14), and the coil (55) sits radially externally therefrom.

12. The magnetic guiding device as defined in claim 1, wherein the element comprises several radial flanges one behind another in the axial direction, and each radial flange is enclosed by an axial yoke.

13. The magnetic guiding device as defined in claim 1, wherein at least one radial bearing (5, 6) is additionally present for the element (2).

14. The magnetic guiding device as defined in claim 13, wherein the radial bearing (5, 6) comprises a bearing ring (12, 16) sitting on the shaft, and at least one radial bearing stator (19 through 22) axially opposite that ring on at least one side, permanent magnets (23 through 31) being provided both on the bearing rings and on the radial bearing stators (19 through 22).

15. The magnetic guiding device as defined in claim 14, wherein several permanent magnets (23 through 31) are arranged next to one another in the radial direction.

16. The magnetic guiding device as defined in claim 15, wherein the permanent magnets (23 through 31) are in contact with one another against the radial bearing stator (19 through 22) and the bearing ring in the radial direction.

17. The magnetic guiding device as defined in claim 15, wherein in the radial direction, each two adjacent permanent magnets (19 through 22) are oppositely polarized.

18. The magnetic guiding device as defined in claim 14, the radial bearing stator (19 through 22) comprises several sub-stators distributed over the circumference and having permanent magnets (23 through 31).

19. The magnetic guiding device as defined in claim 14, wherein the radial bearing stator (19 through 22) is embodied as an annular stator, and the permanent magnets (23 through 31) as annular magnets.

20. The magnetic guiding device as defined in claim 14, wherein the bearing ring (12, 16) is respectively enclosed on both sides by radial bearing stators (19 through 22).

21. The magnetic guiding device as defined in claim 20, wherein each two radial bearing stators (19 through 22) are combined into one radial yoke (17, 18) that is U-shaped in cross section.

22. The magnetic guiding device as defined in claim 14, wherein at least one radial bearing stator (19 through 22) is supported via spring and damper elements (35, 36; 40 through 44) on a housing-mounted part (37, 38, 39) of the magnetic guiding device (1).

23. The magnetic guiding device as defined in claim 22, wherein the spring elements (35, 36; 40, 41, 42) are embodied as axially extending flexural springs (42).

24. The magnetic guiding device as defined in claim 23, wherein each radial bearing stator (19 through 22) is connected to the housing-mounted part (37, 38, 39) via several flexural springs (42) distributed over the circumference.

25. The magnetic guiding device as defined in claim 24, wherein the flexural springs (42) are each part of a cage (35, 36) that connects the ends of the flexural springs (42) via cage rings (40, 41).

26. The magnetic guiding device as defined in claim 25, wherein the cage (35, 36) surrounds the respective radial bearing stators (19 through 22).

27. The magnetic guiding device as defined in claim 22, wherein the radial bearing stator or stators (19 through 22) are braced via at least one damping element (43, 44) against the housing-mounted part (37, 38, 39).

28. The magnetic guiding device as defined in claim 27, wherein the damping element (43, 44) is embodied annularly and coaxially with respect to the element (2).

29. The magnetic guiding device as defined in claim 27, wherein the damping elements (43, 44) are embodied as liquid films.

30. The magnetic guiding device as defined in claim 29, wherein the liquid films (43, 44) contain magnetic or magnetizable particles and are magnetically impinged upon on at least one side via a permanent magnet (45, 46).

31. The magnetic guiding device as defined in claim 30, wherein the permanent magnets (45, 46) are part of the radial bearing or bearings (5, 6).

* * * * *